(No Model.)
A. E. DAIN.
INK BOTTLE.
No. 428,554. Patented May 20, 1890.
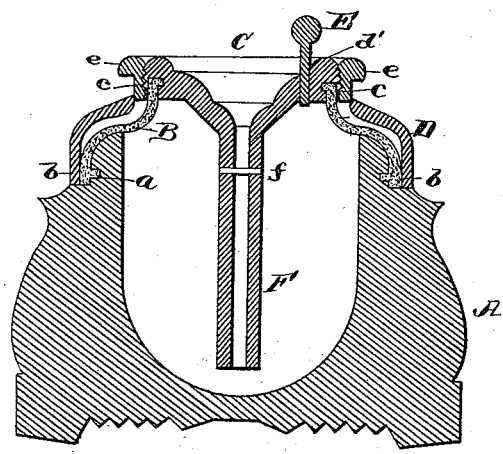
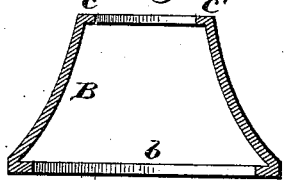
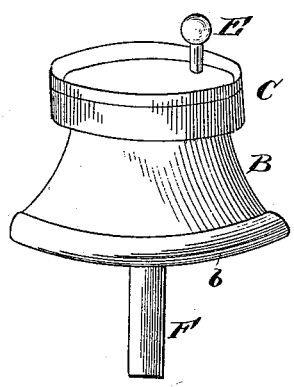
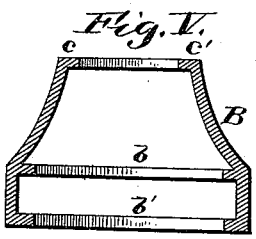
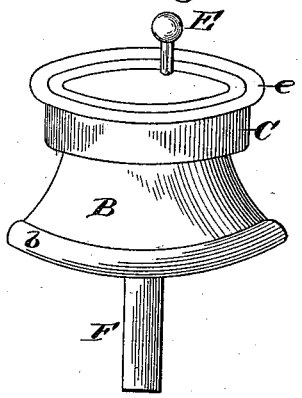
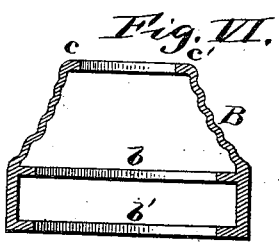
Witnesses:
Inventor:
Albert E. Dain
By Joseph R. Edson
Associate Atty

UNITED STATES PATENT OFFICE.

ALBERT E. DAIN, OF PITTSBURG, PENNSYLVANIA.

INK-BOTTLE.

SPECIFICATION forming part of Letters Patent No. 428,554, dated May 20, 1890.

Application filed February 18, 1890. Serial No. 340,969. (No model.)

*To all whom it may concern:*

Be it known that I, ALBERT E. DAIN, a citizen of the United States, residing at Pittsburg, in the county of Allegheny and State of Pennsylvania, have invented certain new and useful Improvements in Ink-Bottles; and I do hereby declare the following to be a full, clear, and exact description of the invention, such as will enable others skilled in the art to which it pertains to make and use the same, reference being had to the accompanying drawings, which form a part of this specification, in which—

Figure I indicates a vertical central section of my improved ink-bottle. Figs. II and III indicate, respectively, perspective views of the tube and elastic rubber thimble. Figs. IV, V, and VI are sectional views of three different forms or modifications of the rubber thimble.

The object of my invention is to produce a neat, cheap, and durable fountain ink-bottle, in the construction of which I apply the "bottle-stopper" heretofore patented by me, No. 420,676, dated February 4, 1890, and other novel features herein set forth, in combination therewith to produce an ink-bottle of the fountain type, adapted to exclude dust, dirt, and other foreign substance, thereby keeping the ink clean and fresh, and by keeping the ink wholly free from exposure to the atmosphere preventing evaporation thereof.

I will now more specifically describe my invention, reference being had to the accompanying drawings, forming part hereof, in which like letters indicate like parts wherever they occur.

A is the ink bottle or well, preferably formed of glass, the neck thereof being provided with an annular groove $a$, as shown in Fig. I.

B is an elastic rubber thimble, the lower inside circumference of which is provided with the beads $b$ and $b$ to fit into said groove and over the upper edge of the neck of the bottle, respectively; or said thimble may be preferably formed with the lower bead only and flared at the bottom, as shown in Figs. II, III, and IV, and is preferably of greater diameter at its lower extremity than at its upper extremity, as shown in the drawings. Said thimble is formed of rubber of sufficient rigidity to maintain the same and the tube F, which projects in said bottle in an upright position upon the neck of the bottle or well, as specified in my former patent, No. 420,676. The upper inner side of said thimble is provided with a bead $c$, which engages in a groove $d$ upon the upper outside surface of the bowl of said tube, said thimble being retained on said tube by its elasticity, the hard-rubber collar or ring C, which surrounds said thimble at the point of its attachment to the tube, assisting also to maintain and permanently secure said thimble thereon; or said ring or collar may be preferably provided with an internal thread to engage a thread upon the outside surface of the flared mouth of the tube, as shown in Figs. I and III, and is also provided with a flange $e$, as shown in said figures, for the purpose of limiting and regulating the downward movement or dip of the tube, and consequently the quantity of liquid in the bowl of said tube, in which case the collar need not press upon or impinge against the neck of the thimble. When the plain ring or collar shown in Fig. II is used instead of the flanged collar, the downward movement or dip of the tube and quantity of liquid in the bowl thereof may be limited and regulated by the length of the tube, the sides of the circular opening in the top of the convex or curved cap D limiting the lateral motion of the tube and preventing the ink therein slopping over. In the inside of the bowl or flared mouth of said tube, as near the periphery as possible, an orifice is made through the same into the air-chamber formed by the thimble on the neck of the bottle or well, into which is inserted the plug E, which is permitted to remain therein at all times, only removing the same when it is desirable to fill the bottle or well, which can be done, when said plug is removed, by pouring the liquid into said bottle through said tube, thus avoiding the necessity of removing the cap and thimble and danger of soiling the hands in doing so. Said tube is also provided with a small pin $f$, inserted transversely thereof at or near the base of the bowl or flared mouth of said tube to break the force of the liquid in ascending through said tube, preventing squirting and enabling the liquid to flow gently into the mouth of said tube when the same is depressed by thrusting a pen or otherwise applying force upon the elastic thimble. Said cap D is made of hard rubber or other suitable material, and is provided with an orifice in the top thereof sufficiently large to permit said cap to pass over the flared mouth of the tube and to fit neatly thereon, thereby forming a bearing in which the upper end of the tube may operate, said orifice being somewhat larger in case the flanged collar is used instead of the plain ring. Aside from keeping the ink free from dirt, &c., and preventing the evaporation of the same, the user thereof is not compelled to thrust the pen perpendicularly into the bowl of the tube, but may insert the pen at an angle, the orifice in the cap being large enough to permit the deflection of the flexible neck of the thimble to either side to admit of this.

Having described my invention, what I claim, and desire to secure by Letters Patent, is—

1. The combination of an ink well or bottle, a vertical internal tube F, fitted therein and having a rigid flared bowl, an elastic thimble secured at its ends to the mouth of the ink-well and the flared bowl of the internal tube, a rigid external cap fitted tightly over said elastic thimble at its point of attachment to the ink-well and having an orifice in the upper end of the same, through which said internal tube passes, and an adjustable ring carried by the flared bowl of the internal tube and movable freely within the orifice of the rigid external cap, which cap operates to limit the play of the adjustable ring and the internal tube to which it is attached, as and for the purpose described.

2. The combination of a bottle or receptacle, an internal tube provided with a flared rigid bowl, an elastic thimble attached to said bottle or receptacle and the bowl of the internal tube, an external ring carried by the internal tube and connected thereto so as to be moved up or down thereon, and a fixed external cap surrounding the elastic thimble and arranged in the path of the external ring to limit the downward movement of said ring and the internal tube to which the ring is attached, substantially as and for the purpose described.

3. The combination of an ink well or receptacle, an internal tube F, provided with a transverse pin $f$ at an intermediate point of its length and having the flared bowl at its upper end, said bowl having a filling-aperture and a removable plug, an adjustable ring or band screwed on the flared bowl of the internal tube, an elastic thimble attached to the ink-well and the bowl of the tube, and a rigid cap D, which incloses the elastic thimble and receives the lower end of the adjustable band or ring, substantially as described.

In testimony that I claim the foregoing I hereunto affix my signature this 4th day of February, A. D. 1890.

ALBERT E. DAIN. [L. S.]

Witnesses:
 JOHN Q. EVERSON,
 C. C. LEE.